United States Patent [19]

Sirven

[11] 3,966,030
[45] June 29, 1976

[54] HYDRAULIC SHOCK ABSORBER FOR VEHICLE SUSPENSION

[76] Inventor: Jacques Sirven, 87 Boulevard Saint-Michel, Paris, France

[22] Filed: May 19, 1975

[21] Appl. No.: 578,858

Related U.S. Application Data

[63] Continuation of Ser. No. 408,353, Oct. 23, 1973, abandoned, which is a continuation-in-part of Ser. No. 216,627, Jan. 10, 1972, abandoned.

[30] Foreign Application Priority Data

Jan. 13, 1971    France .............................. 71.00893

[52] U.S. Cl. ............................... 188/318; 188/279; 188/315; 188/322
[51] Int. Cl.² ...................... F16F 9/19; F16F 9/34
[58] Field of Search ........... 188/314, 315, 318, 322, 188/279, 317

[56] References Cited
UNITED STATES PATENTS

| | | | |
|---|---|---|---|
| 2,035,954 | 3/1936 | Focht .................................. | 188/314 |
| 2,320,314 | 5/1943 | Trask ................................. | 188/315 X |

FOREIGN PATENTS OR APPLICATIONS

| | | | |
|---|---|---|---|
| 801,612 | 12/1968 | Canada .......................... | 267/DIG. 2 |

Primary Examiner—George E. A. Halvosa
Attorney, Agent, or Firm—Beveridge, DeGrandi, Kline & Lunsford

[57] ABSTRACT

A vehicle shock absorber of the hydraulic cylinder and piston type, including a control valve which, during compressive movement, limits pressure of the hydraulic fluid and thereby the damping force of the device in accordance with the rate of compressive movement above a predetermined rate. Operation of the valve may be controlled by pressure generated by obstructing the flow back to the reservoir of fluid displaced by the piston rod entering the cylinder on compressive movement, which pressure will vary in accordance with the rate of compression and consequently the rate of entry of the rod into the cylinder. A pressure control device is provided to limit the damping force during expansion of the shock absorber to thereby permit better road holding ability of the vehicle, with the relative strong damping force at the beginning of the following compressive movement acting to control oscillation of the suspended mass of the vehicle.

10 Claims, 14 Drawing Figures

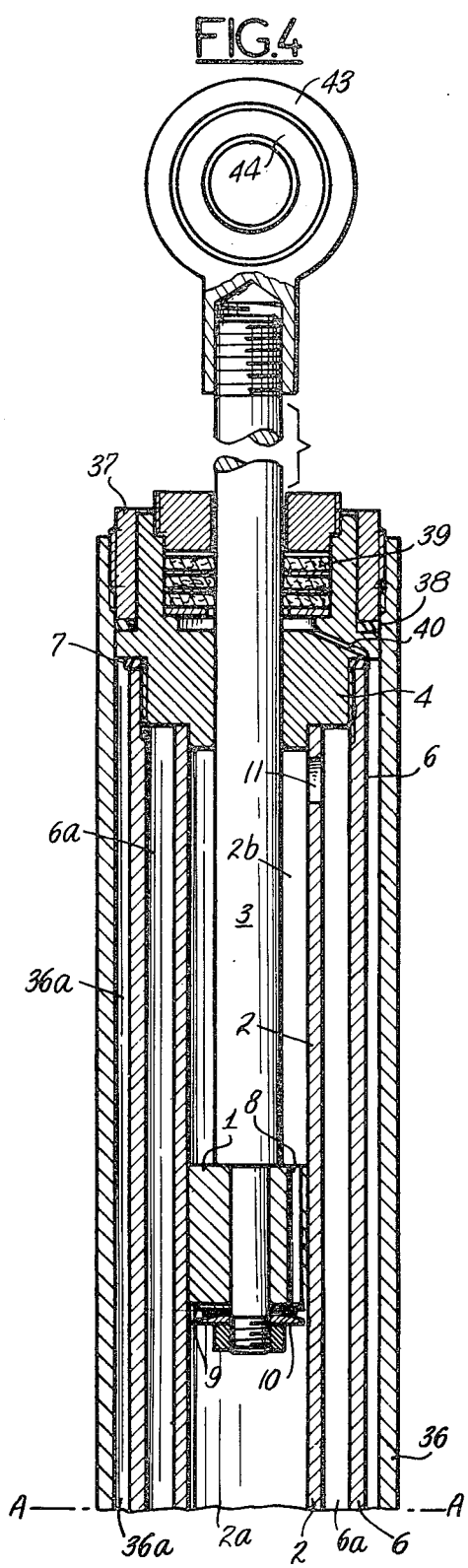

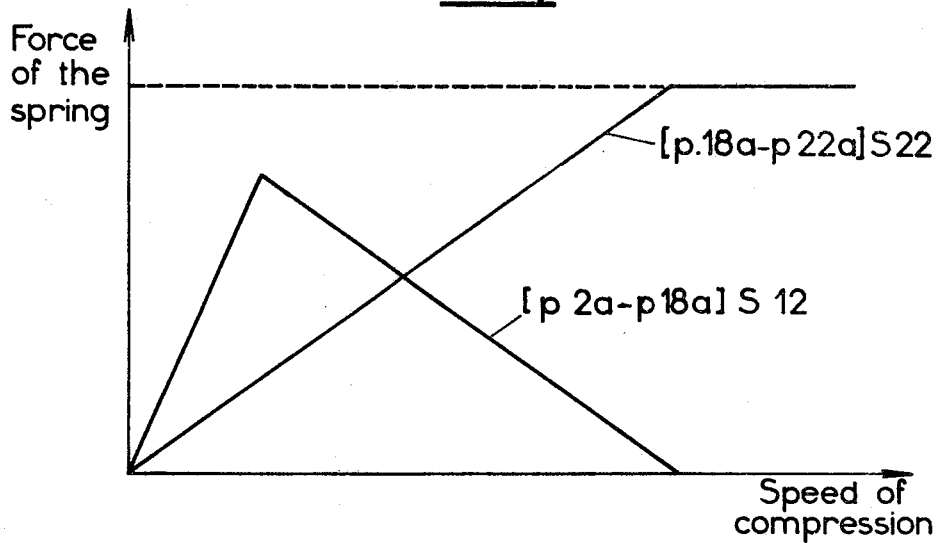
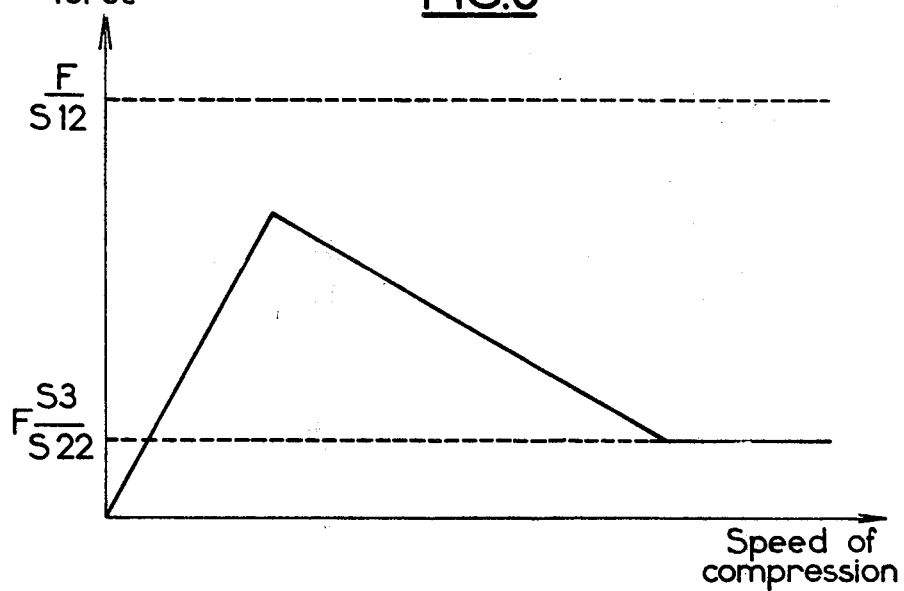

HYDRAULIC SHOCK ABSORBER FOR VEHICLE SUSPENSION

REFERENCE TO EARLIER APPLICATION

This is a continuation, of application Ser. No. 408,353 filed Oct. 23, 1973, which is a continuation-in-part of application Ser. No. 216,627 filed Jan. 10, 1972 both now abandoned.

SUMMARY OF THE INVENTION

This invention relates to shock absorbers for suspending vehicles. In the study of vehicle suspensions a distinction is made between the suspended part, consisting of the major portion of the vehicle, and the nonsuspended part comprising the wheels, tractor treads, or skis, and the suspension mount. Between these two parts the suspension is introduced, consisting for example, of resilient means such as springs, torsion rods, rubber members, or pneumatic cylinders, and damping means which produce a resistive force, that is to say a force connecting the two parts which always opposes relative movement therebetween.

This force may have a constant and absolute value, as in certain friction dampers, but is usually variable and increases with the speed of relative displacement in the most common type of hydraulic shock absorbers, and may also change in value in dependence on both time and the direction of relative movement.

It is known that with such shock absorbers the selection of the damping value always involves a difficult compromise.

It is consequently normal to limit the damping effect in the direction of compression to relatively small values so that passage over a bump does not result in an abrupt acceleration of the suspended mass. On the other hand, in order to prevent the suspended mass from oscillating, the damping of expansion is kept at a relatively high value, and this results in failure to hold the road when passing over depressions.

The object of the invention is to eliminate the foregoing disadvantages, that is to say, to provide a shock absorber which during prolonged compressive movements of the suspension strongly damps the oscillations of the body and creates a very weak damping force when the vehicle passes over a bump, the horizontal dimensions of which are small as compared with its height, which bump causes rapid compression of the suspension. In such a shock absorber, the damping force during expansive movement may be relatively weak so as to avoid failure to hold the road.

The shock absorber according to the invention is characterized by the fact that it comprises in combination a hydraulic shock absorber of the telescopic type and a control valve, which during compressive movements of the suspension, limits the pressure of the hydraulic fluid which exerts pressure against the piston, and consequently the damping force, to a value which decreases as the rapidity of compressive movement exceeds a predetermined value. The pressure used to control the valve is obtained by inhibiting, by suitable means, the flow of fluid driven toward the fluid reservoir by an increase in the immersed volume of the piston rod of the shock absorber.

In one embodiment of the invention said suitable device comprises one or more small passages.

In another embodiment, this device comprises a pressure relief valve mounted in parallel with one or more small passages.

In order that the object of the invention may be better understood there will now be described, purely by way of illustration and example, several embodiments of the invention, with reference to the accompanying drawings in which:

FIG. 4 is a sectional view taken along the same line as FIG. 3, and meeting FIG. 3 along the line A—A;

FIG. 5 shows the variations in the different forces acting on the valve as a function of the speed of compression;

FIG. 6 shows the variation in the damping force as a function of the speed of compression;

FIG. 7 is an axial section taken through the lower part of a second embodiment of the shock absorber;

Figure 1:
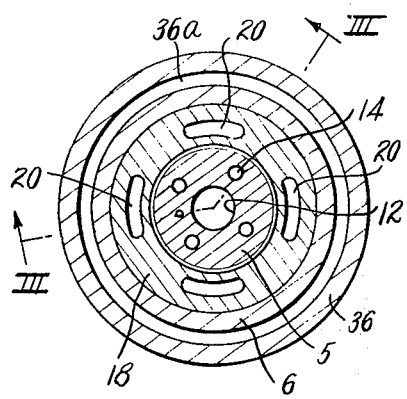
FIG. 1 is a transverse section through a first embodiment of the invention, taken along the line I—I of FIG. 3.
Figure 2:
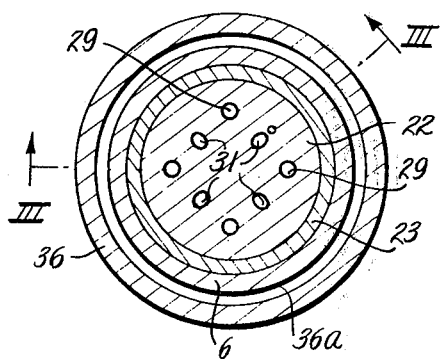
FIG. 2 is a transverse section taken along the line II—II of FIG. 3.

Turning now to the embodiment of FIG. 1, the shock absorber comprises a piston (FIG. 4) sliding in a cylinder 2 and attached to a rod 3 which passes through a seal on the cover 4 closing the top of the cylinder 2. The lower part of the cylinder 2 is sealed fluid-tight by the member 5 which constitutes the upper part of the control valve.

The cylinder 2 is encircled by a concentric jacket 6 which is connected to the cover 4 by means of seal 7. The lower part of the jacket 6 holds the control valve assembly. The piston 1 is provided with four ducts 8 parallel to the axis of the shock absorber. The upper ends of these ducts communicate with the space 2b inside the cylinder 2 above the piston 1. The lower ends of the ducts 8 communicate with the space 2a inside the cylinder 2 beneath the piston 1 through a one-way pressure relief device comprising two resilient washers 9 and a circular support 10. This device serves two purposes, namely to prevent the fluid from passing through the piston 1 from the bottom to the top, and to limit the difference in pressure between the space 2b and the space 2a. The upper part of the cylinder 2 is pierced by four radial ports 11 which connect the space 2b and the space 6a between the cylinder 2 and the jacket 6. The member 5 at the lower end of the cylinder 2 has an axial duct 12, the upper part of which opens into the space 2a and the lower part of which is normally blocked by the ball 13. The member 5 has four ducts 14 parallel to the axis of the shock absorber, the upper ends of which are in communication with the space 2a through a non-return valve 15. The lower ends of the ducts 14 open into the space 18a surrounding the ball 13. A passage 16 connects one of the ducts 14 to the space 6a. A passage 17 connects the duct 12 to the space 18a. Finally, the member 5 is connected to the member 18 by the seal 19. The outer part of the member 18 is cylindrical and its external diameter is essentially equal to the internal diameter of the jacket 6 which encircles it.

The member 18 holds the ball 13 so as to keep its center near the axis of the shock absorber, and is provided with four ducts 20 parallel to said axis. The upper ends of the ducts 20 communicate with the space 6a through a non-return valve 21. The lower ends of the ducts 20 communicate with the space 18a.

The space 18a which surrounds the ball is delimited at its bottom by a second piston 22. The jacket 6 contains a sleeve 23 in its lower part. Sealing means 24 is provided between the sleeve 23 and the member 18, and sealing means 26 is provided between the sleeve 23 and the member 25 which closes the lower part of the jacket 6.

The piston 22 slides inside the sleeve 23 and transmits to the ball 13 the force exerted by spring 27, which tends to bias the ball against the end of the duct 12. A cap of elastic material 28 is positioned on the piston 22 so as to increase the surface bearing on the ball.

The piston 22 is provided with four ducts 29 parallel to the axis. The upper ends of these ducts communicate with the space 18a through a non-return valve 30. The lower ends of these ducts communicate with space 22a inside the piston 22 within which the spring 27 is positioned. The piston 22 also has four oblique ducts 31. The upper ends of these ducts 31 communicate with the space 18a while the lower ends communicate with the space 22a through a one-way pressure control device consisting of two resilient washers 32 and a circular support 33, which device serves the purpose of limiting the difference between the pressure of the hydraulic fluid in the space 18a and that in the space 22a. A narrow discharge passage 34 connects the central part of one of the ducts 31 directly to the space 22a.

The spring 27 bears on the member 25 which closes the lower part of the jacket 6 and biases the piston 22 through a cross member 35. The member 25 is axially pierced and its lower part is recessed at two points around its periphery so as to connect the space 22a and the space 36a encircling the jacket 6.

The components inside the jacket 6 are held together by being gripped between the member 4 and the member 25.

Figure 3:
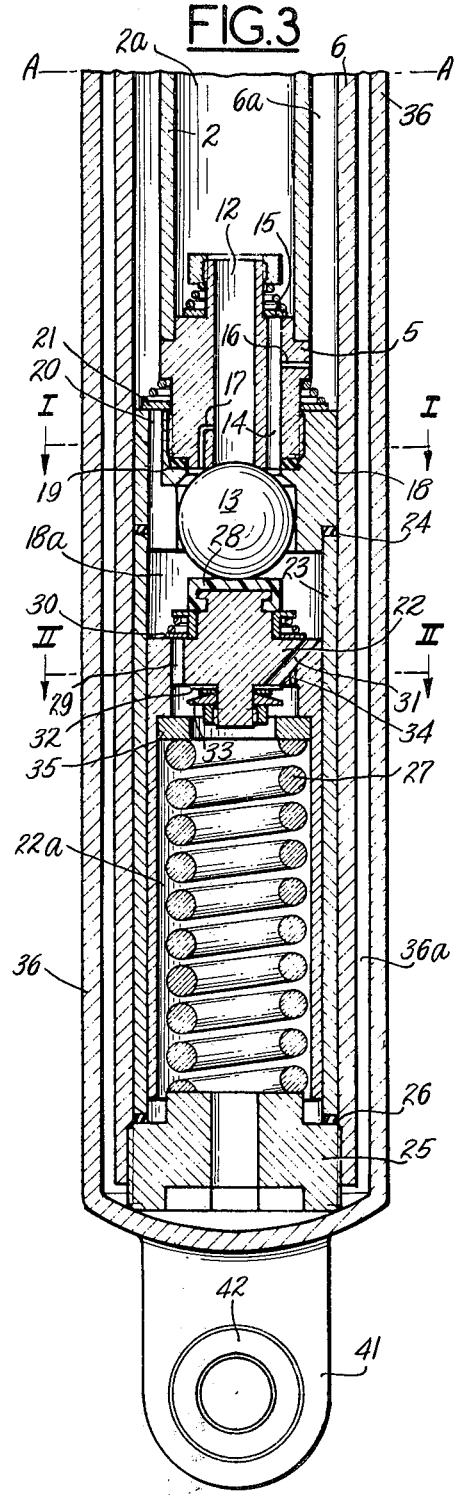
FIG. 3 is the lower part of an axial section taken along the line III—III of FIGS. 1 and 2.

Encircling the jacket 6 is an outer casing 36 sealed at its upper end to the member 4 by the ring 37 and seal 38. Leakage of fluid during the movement of the rod 3 is prevented by the seal 39. The fluid which has a tendency to rise along the rod is returned to the space 36a by two oblique ducts 40. Finally, a ring 41 is mounted on the lower end of the outer casing 36. This ring is provided with a resilient block 42 and adapted to attach the shock absorber to a point on the non-suspended mass of the vehicle. At the upper end of the rod 3 is a ring 43 provided with a silence block 44 and adapted to attach this end of the shock absorber to a suspended part of the vehicle. All the space within the shock absorber is filled with hydraulic fluid (not shown in these figures), except for the upper part of the space 36a, which contains air at a pressure which is never very high as compared with atmospheric pressure. The sectional views of FIGS. 3 and 4 are such that the left-hand side shows the duct 17, one of the ducts 20, and one of the ducts 29, while the right-hand side shows the ducts 40, one of the ports 11, one of the ducts 8, one of the ducts 14, the duct 16, one of the ducts 31, and the duct 34.

In accordance with the invention, the shock absorber, when the suspension is being compressed, creates a damping force which decreases when the rate of compression movement increases beyond a predetermined value. To study the operation of the shock absorber, it is necessary to consider a compression, the rate of which increases from zero. In the following, a pressure in a space n will be designated by pn. On the other hand, the area of the piston 1 will be designated by S1, that of piston 22 by S22, that of the rod 3 by S3, and finally S12 represents the area of the ball 13 which bears on the end of the duct 12, an area which is very close to the area of the duct itself.

F represents the force of the spring tending to bias the ball 13 against the end of the duct 12. During compression of the suspension, the volume of the space 2a decreases, that of the space 2b increases, the fluid in the spaces 2b and 6a is thus subjected to suction, the non-return device 21 is open, and the pressures p18a and p2b are substantially equal. On the contrary, the non-return valve 15 is closed, as is the non-return valve 9 of piston 1. The fluid in the space 2a enters the space 18a through the duct 17 and when the valve is opened, the fluid also enters 18a through the lower end of the duct 12. If V represents the rate of movement of the piston 1, the flow of fluid entering the space 18a equals V × S1. Part of this fluid flows through the ducts 20 and returns to the space 6a, and then the space 2b, with the corresponding flow equal to V (S1 −S3). The other part of this fluid enters the space 22a through the duct 34, or through the pressure relief device 32. The corresponding flow is equal to V × S3. The operation is as follows: When the rate V increases, while remaining small, the duct 17, being of small section, and the flow leaving the space 22a being large, the pressure drop p2a −p18a increases very rapidly. On the other hand, the pressure drop between the space 18a and the space 22a remains small, because the corresponding flows VS3 is relatively small and the dimensions of the duct 34 are such that it produces a small pressure drop for small values of V. The valve is then opened when the sum of forces F1 and F2 exerted by the pressure difference p2a − p18a on the section S12 and by the pressure difference P18a − p22a on the section S22 exceeds the opposing force F of the spring. The dimensions of the ducts 17 and 34 are such that the second term of the sum increases much more slowly that the first. For small values of V, the valve limits the pressure difference P2a − p18a to a value which is a little lower that the quotient F/S12. At this high limiting value of the pressure difference, p2a − p18a and hence p2a − p2b corresponds to a high value of the damping force. When the speed increases from zero the valve is closed and the value of the damping force increases for a relatively low value of the speed. The valve then begins to open and this corresponds to maximum damping force. When the speed continues to increase, the pressure drop p18a − p22a increases progressively. The equilibrium position of the valve requires inequality between the force F of the spring and the sum of the two forces F1 and F2 exerted by the fluid.

$$F_1 = (p2a - p18) S12$$

$$F_2 = (p18a - p22a) S22$$

When the second term increases and the sum is constant, the first term decreases. It follows from this that the damping force decreases progressively, and when the hydraulic force $F2 = (p18a - p22a) S22$ balances the force $F$ of the spring 27, the valve remains open, and the pressure is equal on the two faces of the piston 1. The damping force then has substantially the value $F$ S3/S22. The pressure limiting device 32 then opens progressively so as to prevent any further increase in the pressure p18a, and consequently the damping force, when the speed continues to increase. The graph of FIG. 5 shows the variation in the different forces acting on the valve and FIG. 6, the variation in the damping force.

The operation of the shock absorber during the expansion of the suspension differs from its operation during compressive movements. During an expansion movement, the piston 1 rises in the cylinder 2. The volume 2b diminishes and the volume 2a increases. The increase in pressure in the space 6a closes the non-return device 21. The depression in the space 2a opens the non-return device 15. The pressure on the valve is decreased, the valve is closed and does not operate. At low speeds, the fluid leaves the space 2b through the ports 11 and then through the space 6a and through the small diameter duct 16, to return to the duct 14 and the space 2a. To compensate for the variation in the immersed volume of the rod 3, hydraulic fluid contained in the space 36a passes through the member 25 and then the piston 22, via the ducts 29, and the non-return device 30, which is open, and finally through the member 5 by way of the ducts 14, and enters the space 2a. When the speed increases from zero, the pressure difference $p2b - p2a$ begins to increase, together with the damping force. Beginning at a certain value of the pressure difference $p2b - p2a$, the limiting device 9 opens and the pressure and consequently the damping force then remains substantially constant.

The advantages of a shock absorber such as the one which has just been described will become apparent from an analysis of the manner in which the wheel of a vehicle which is thus equipped responds to bumps or depressions in the road. In the first place, a bump having a small horizontal dimension appears like the step of a stairway. When the wheel reaches this obstacle it moves vertically at high speed. The suspended mass, on the contrary is not vertically displaced to any great extent because of its inertia. The movement of the suspension is thus a rapid compression and the damping force is therefore small. When the wheel reaches the level of the top of the bump, the suspension spring has been compressed, and it expands slowly while lifting the suspended mass. This movement is slowed by the shock absorber, which expands. The value of the damping may be smaller than with a normal shock absorber because the suspended mass has a rising speed equal substantially to zero at the beginning of the step, because the damping force during compression movement has been very small.

When passing over an obstacle in the form of a descending step, the operation is as follows. Upon passage of the obstacle the suspension expands and its movement is slightly resisted by the shock absorber. As has been indicated, the value of the damping may be smaller than with a normal shock absorber. Then, once the wheel has passed beyond the obstacle, the suspension compresses slowly, with the shock absorber strongly resisting this movement, thus preventing the suspended mass from oscillating.

The analysis of the operation which has just been made shows the advantage which results from the particular features of this shock absorber which strongly resists compressive movements of the suspension when these movements are at low speed. It is, in effect, possible to decrease the damping effect during expansion without risking oscillation of the suspended mass. Any failure to hold the road is avoided. On the other hand, the small value of the damping force during rapid compression of the suspension makes for a very comfortable suspension.

Figure 8:
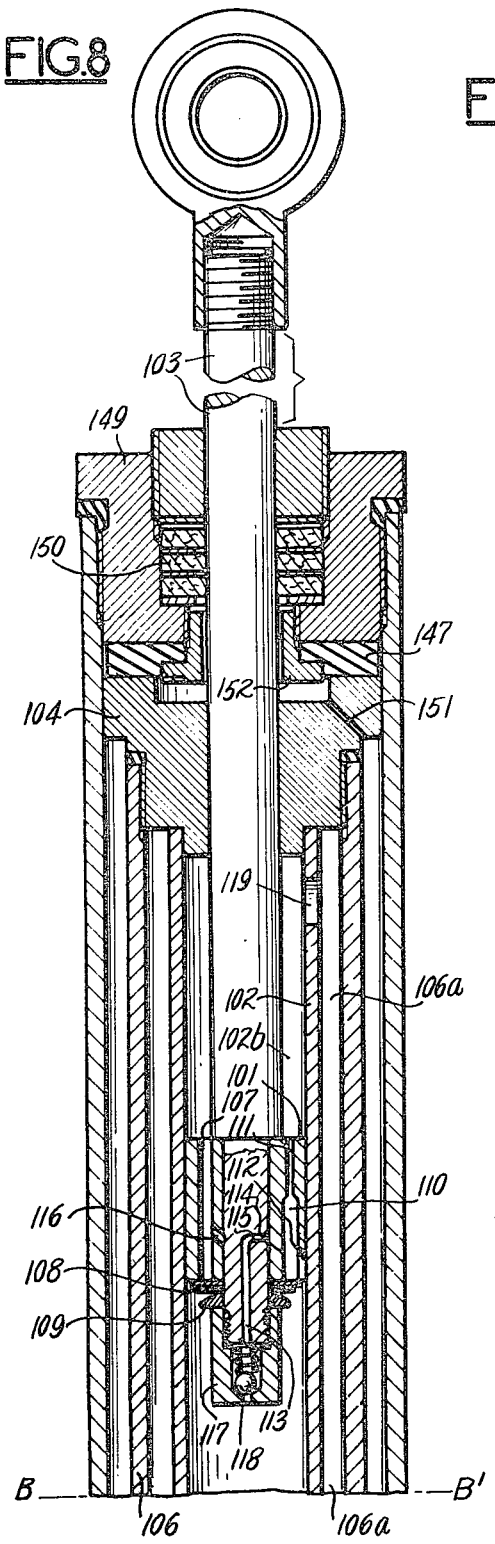
FIG. 8 is an axial section taken through the upper part of the embodiment of FIG. 7 and meeting the part shown in FIG. 7 along the line B—B'.
Figure 9:
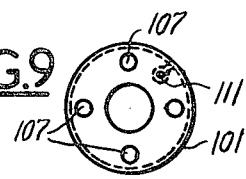
FIG. 9 is a top plan view of the shock absorber of FIG. 7.

Another embodiment is illustrated in FIGS. 7, 8 and 9. In this embodiment, the shock absorber comprises a piston 101 sliding in a cylinder 102 and fixed to a rod 103 which passes through a seal in a cover 104 forming the upper part of the cylinder 102. The lower part of the cylinder 102 is sealed closed by the member 105 which constitutes the upper part of the control valve. Around the cylinder 102 and concentric therewith is a jacket 106 which is sealed to the cover 104 and the member 105. Fluid-tightness between the cylinder 102 and the member 105 is ensured by the fact that the cylinder 102 is gripped between the members 104 and 105. The piston 101 has four ducts 107 parallel to its axis. The upper ends of these ducts open into the space 102b inside the cylinder 102 above the piston 101.

The lower ends of the ducts 107 communicate with the space 102a beneath the piston through a device comprising two washers 108 and a rounded support 109. This device prevents the hydraulic fluid from flowing out of the ducts 107 from top to bottom and on the other hand limits the pressure difference between the space 102b and the space 102a.

The piston 101 also comprises a duct 110 parallel to the axis, the upper end of which communicates with the space 102b through a calibrated passage 111 and with the space 102a through a small, radial duct 112 which opens into the lower part of the piston, the diameter of which at this level is smaller than that of the cylinder 102. The lower end of the rod 103 has a small diameter axial duct 113 which is connected to a groove or necked-in portion 114 at the periphery of the rod by the duct 115. A duct 116 in the piston 101 connects the neck 114 to one of the ducts 107.

FIG. 8 shows at its left-hand side a section taken through the duct 107 to which reference has just been made, and on its right-hand side a section taken through the ducts 110 and 111. The lower part of the rod 103 is attached to the member 117 which holds the piston 101 on the rod 103. The lower part of this member holds a balltype non-return valve 118. Openings 119 in the upper end of the cylinder 102 connect the space 102b and the space 106a between the jacket 106 and the cylinder 102. The member 105 has an axial duct 120, the upper end of which opens into the space 102a and the lower end of which is blocked by the ball 121. The member 105 comprises four ducts 122, one end of which opens through a non-return valve 123 into the space 102a and the other end of which opens freely into the space 145a surrounding the member 105. The member 105 also comprises four ducts 124 permanently connecting the space 106a and the space 105a encircling the ball 121. The lower left-hand part of member 105 in FIG. 7 is a section passing through one of the ducts 124 and the right side is a section passing through one of the ducts 122. The seat 125 of the ball 121 is biased by the spring 126 and supports the ball 121 on the end of the duct 120. A cylinder 127 has its upper end sealingly mounted on the lower end of member 105. On the other end of the cylinder 127 is sealingly mounted a cylindrical member 128 in which slides a piston 129. The piston 129 and the seat 125 for the ball 121 are unilaterally connected by a rod 130 to the upper end of which is attached a nut 131 caged inside a hollow member 132 which is itself attached to the seat 125. A member 133 is mounted in the upper end of the member 128 and serves as a lower support for the spring 126 and as a guide for the rod 130. In this member 133 are two orifices which connect the space 127a inside the cylinder 127 and the space 128b inside the member 128 mounted on the piston 129. A slight lateral play exists between the rod 130 and the member 132 so that the ball 121 perfectly closes the end of the duct 20 when the valve is closed.

The piston 129 contains four ducts 134, the upper ends of which open freely into the space 128b and the lower ends of which open into the space 128a inside the member 128 beneath the piston 120 through a device 135 similar to the device constituted by the members 108 and 109 of the piston 101, which limits the difference in pressure between the space 128b and the space 128a. A small diameter duct 136 connects one of the ducts 134 to the space 128a permitting, in response to a large pressure drop, the flow of fluid between the space 128b and the space 128a.

At the bottom of the member 128 and inside it is mounted in a fluid-tight manner a member 137 which supports a control valve. The control valve comprises a body 138 fixed inside the member 137 which defines an axial duct 139. A valve member 140 axially guided in this duct is adapted to close the upper end of the duct. The valve member is guided by four vanes which are radially distributed about the rod. At the lower end of the valve member is a support 141 which supports a spring 142. The very weak force of the spring tends to close the valve. The seat 138 of the valve holds pressed against the member 137 two resilient washers 143, which are relatively thick and close four ducts 144 in the member 137. The lower part of the member 128 has the shape of a hollow cylinder, the outer diameter of which is greater than that of the upper part of the member. This lower part of the member 128 is slidable in the outer jacket 145 of the shock absorber.

Four ducts 146 connect the space 140a surrounding the tip of the valve member 140 to the space 145a inside the jacket 145 and outside the member 128. FIG. 7 shows on its left side a section through the axis of one of the ducts in the member 133 and through the axis of a duct 144 as well as the axes of one of the ducts 146, and in plan a guiding vane of the valve member 140. The right side of the Figure shows a section taken through the axes of a duct 134 and the duct 136. In the upper part of the shock absorber, the upper part of the member 104 has a diameter equal to the internal diameter of the jacket 145. The assembly comprising those components between the members 104 and 128 and inside the cylinders 106 and 127 is movable parallel to the axis of the shock absorber inside the outer jacket 145. This movement is limited at the top by the elastic stop 147 and at the bottom by the elastic stop 148. The upper end of the jacket 145 is closed by a cover 149, inside which is located a sealing member 150 which prevents the fluid from escaping from the shock absorber and forces it to return into the space 145a through the duct 151 in the member 104. An annular member 152 holds the stop 147 on the cover 149. In the lower part of the jacket 145 is a member 153 which supports the stop 148. The stop 148, and the member 153, are held by the member 154 which passes through the jacket 145 and is fixed to the ring 155 for attaching the shock absorber to the non-suspended part of the vehicle. The ring 155 is welded to the jacket 145 which renders the shock absorber fluid-tight. While the member 104 engages the stop 147, the nut 141 at the tip of the valve member 150 cannot bear on the member 154, but, when the member 128 rests on the stop 148, the nut 141 bears on the member 154 and the valve member 140 is in the open position.

The ring 155 is equipped with a silence block. On the upper end of the rod 103 there is also a ring equipped with a silence block for connecting that end of the shock absorber to the suspended part of the vehicle. All of the space inside the shock absorber is filled with hydraulic fluid, not shown, except for the upper part of the space 145a, which is filled with air.

The operation of the shock absorber requires that the level of fluid in the space 145a be such that the ends of the ducts 122 are permanently immersed. In an embodiment of the invention quite similar to the one which has just been described, small diameter tubes are attached in a fluid-tight manner to the ends of the ducts 122, the other ends of these tubes being positioned in the lower part of the space 145a, so that, even if the level of the fluid descends beneath the level of the ends of the ducts 122, air will not penetrate into the space 102a.

The operation of the shock absorber according to the embodiment which has just been described is as follows: During compression of the suspension, the assembly consisting of the internal part of the shock absorber between the members 104 and 128 slides in the jacket 145 and presses against the stop 148. In this position, the nut 141 bears on the member 154 and the valve 140 is in open position. The operation is then like the one which has already been described. For very slow movements the guided valve is in a closed position and fluid passes from the space 102 to the space 102b through the piston 101, eithr passing by the ball 118 and through the duct 113, the neck 114, the duct 116 and the duct 107, or through the duct 112, the duct 110, and the duct 111. The fluid expelled by depression of the rod 103 in the space 102b flows toward the piston 129 through the space 106a, the ducts 124 and space 105a and the space 127a. This fluid passes through the piston 129 via the ducts 134 and 136 and, then through the duct 139, and the duct 146 returns to the space 145a in which the fluid level rises. When the speed of movement increases, the pressure difference between the space 102a and the space 102b increases, together with the damping force, until the control valve opens. When the speed continues to increase, the difference in pressure between the space 128b and the space 128a increases, with the force exerted on the piston 129 having a tendency to open the valve, which has the effect of decreasing the pressure difference between the space 102a and the space 102b and consequently the damping force. When the pressure is the same in the space 102a and the space 102b, the pressure limiting device 135 is actuated and makes it possible to maintain the damping force at a low value, which is substantially constant for high speeds.

During expansion of the suspension, the assembly comprising the internal part of the shock absorber between the members 104 and 128 slides in the jacket 145 and presses against the stop 147. The nut 141 does not bear against the member 154 and the valve 140 is closed by the spring 142. The fluid does not pass from the space 128a to the space 145a either through the valve 140 or through the ducts 144 because the resilient washers 143 are very stiff and close the ends of the ducts 144 unless there is an abnormal excess pressure inside the shock absorber. It follows from this that the pressure within the space 128a is the same as in the space 128b.

The pressure inside the space 102b is then greater than that within the space 102a, the control valve closes, and plays no further part during the expansion movement. During this movement, the fluid passes through the piston 101 to pass from the space 102b to the space 102a, using either ducts 111, 110 and 112 or the ducts 107 and the pressure limiting device 108. The operation of this embodiment is similar to the one previously described in connection with the first embodiment of the invention. Thus, during the expansion movement, hydraulic fluid passes from the space 145a to the space 102a through the ducts 122 and the non-return device 123 to compensate for the decrease in the immersed volume of the rod 3.

The function of the resilient washer 143 is to avoid any accidental excess pressure inside the shock absorber from causing a mechanical rupture within the shock absorber. This excess pressure could occur only during a compressive movement. The internal part of the shock absorber could not slide in the jacket 145 if the latter were deformed by a shock or if the washer 148 were deformed so as to prevent such sliding movement. The vale 140 would then remain closed during compression of the suspension and an excess pressure could occur.

The second embodiment differs from the first in several particulars and especially in the design of the control valve, but the principal difference resides in the means utilized to prevent the control valve from operating during expansion of the suspension. In the first embodiment (as shown in FIG. 3) the valve member 21 isolates the valve and the pressures on the two sides of the piston 22 are equal and weak. In the second embodiment (FIG. 7) the valve 140 prevents the fluid from leaving the central part of the shock absorber, the pressures on the two sides of the piston 129 are equal but higher than in the preceding case, and the piston 129 has no effect on the valve which closes in response to the bias of the spring 126.

Other simpler embodiments than the foregoing are derived from the first embodiment shown in FIG. 3 by eliminating the non-return valve 21, and from the second embodiment shown in FIG. 7 by eliminating the assembly of components carried by the member 137, including the valve 140, and making the assembly of components between the member 104 and the member 128 integral with the jacket 145. These simplified embodiments have the same characteristics as the foregoing during compression of the suspension, that is to say, the damping force is increased for slow speeds and weak for high speeds. The damping force is, on the contrary, necessarily weak during expansive movements because, since the valve is not isolated as in the foregoing embodiments, the pressure limiting means in the piston actuating the control valve limits the damping force to a low value.

Figure 10:
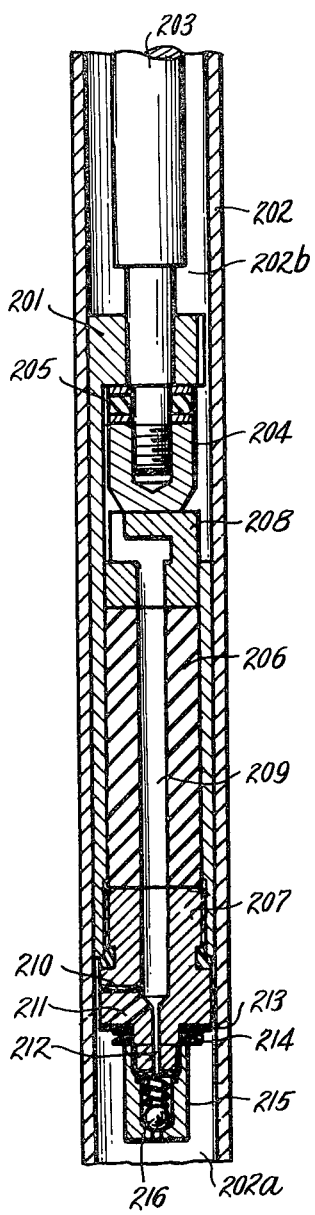
FIG. 10 is an axial section taken through the piston, piston rod and the cylinder encircling the piston of a third embodiment of the invention.
Figure 11:
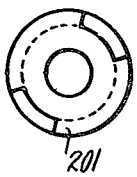
FIG. 11 is a plan view of the piston of FIG. 10.
Figure 12:
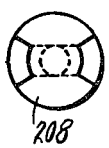
FIG. 12 is a plan view of the member 208 which is inside the piston of FIG. 10.

Another embodiment, which is illustrated in FIGS. 10, 11 and 12, differs from the second embodiment shown in FIGS. 7, 8 and 9 and from the simplified embodiments which have just been described solely in the way in which the piston and piston rod of the shock absorber are made.

FIG. 10 is an axial cross section through the piston, the piston rod and the cylinder which encircles the piston, which cylinder is, in the embodiment of FIGS. 10-12, indicated by reference numeral 202. This section is cut off at the top and the bottom so as to show only the zone near the piston. FIG. 11 is a top plan view of the piston and FIG. 12 is a top plan view of the member 208 which is inside the piston 201.

In this embodiment of the invention, the piston 201 which slides in the cylinder is resiliently connected to the rod 203. Consequently, the rod 203 slides in the upper part of the piston 201. This movement is limited at the top by contact between the nut 204 and the upper part of the piston 201 through the resilient washers 205. This movement is limited toward the bottom by the compressive force of the elastic member 206 which is located in the piston 201 and compressed between the plug 207 fixed to the piston 201 and the crossbar 208 which is engaged by the nut 204. The fluid flows freely through the space 202b around the rod 203 to the central duct 209 in the plug 207.

To this end, the upper part of the piston 201 and the crossbar 208 are both divided into two angularly opposed sectors, and both the lower part of the crossbar 208 and the resilient member 206 are provided with axial ducts. The plug 207 carries an assembly of components which, in the embodiment illustrated in FIG. 8, are located in the piston. The ducts 210, 211 and 212 serve essentially the same role as the ducts 111, 107 and 113 of FIG. 8, and the members 213, 214, 216, respectively serve the same purpose as the members 108, 109, 117 and 118 of FIG. 8. The section of FIG. 10 shows on its left side a solid part of the piston 201, a recessed part of the crossbar 208, the duct 210 and one of the ducts 211 and, on its right side, a recessed part of the piston 201 and a solid part of the crossbar 208.

The operation of a shock absorber according to this embodiment is identical with the one shown in FIGS. 7, 8 and 9 or in one of the simplified embodiments when the movement is expansive, or in the case of a compressive movement at substantially constant speed. It differs, on the other hand, from the preceding embodiments when the compressive speed, commencing from zero, increases too rapidly to attain a high value. In the embodiments of FIGS. 7, 8 and 9, the damping force increases, passes a maximum, and then decreases. For an instant, which may be very short, the damping force is very high. In this embodiment of FIGS. 10, 11 and 12, at the beginning of its movement, the rod 203 is in its upper position with respect to the piston 201. Regardless of the speed of movement the damping force which is transmitted by this rod is small because the elastic material 206 is expanded. The beginning of a rapid compression movement causes compression of the elastic material 206 which compression takes place to a substantially constant volume. This results in an increase in the volume of the components immersed in the fluid and a rapid increase in the pressure on the piston of the control valve. If the speed of movement is rapid, the valve opens before the damping force has attained a high value. This device still further increases the comfort of the suspension without impairing its road holding properties.

Figure 13:
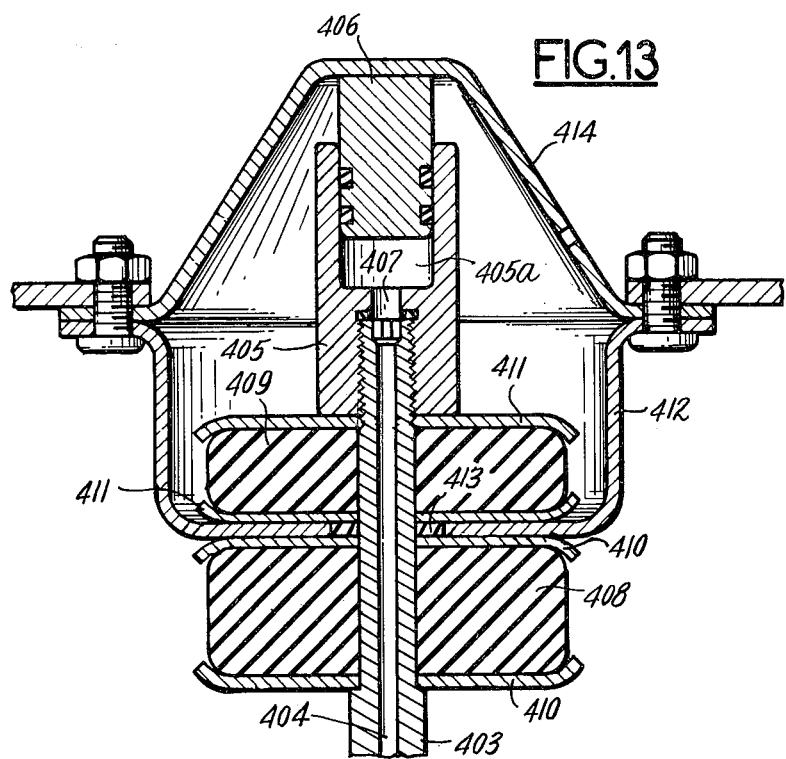
FIG. 13 shows a section taken through the upper end of the piston rod of yet another embodiment of the invention.
Figure 14:
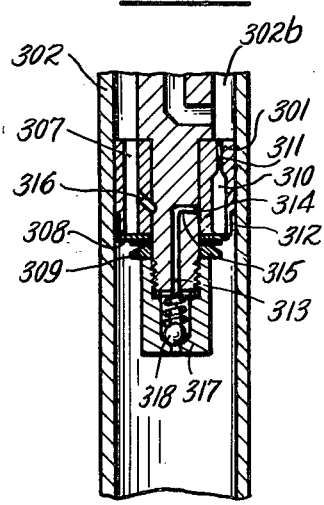
FIG. 14 shows a section taken through the immersed part of this piston rod in the zone nearest the piston.

Another embodiment which is described in FIGS. 13 and 14 differs from the second mode illustrated in FIGS. 7, 8 and 9 or a simplification thereof only in the way in which the piston rod of the shock absorber is made and mounted on the chassis of the vehicle. FIG. 14 shows in section the immersed part of the rod in the zone near the piston, with FIG. 13 showing a section of the upper end of the rod. In FIG. 14, parts 301, 302, and 307–318 correspond to parts 101, 102 and 107–118, respectively, in FIG. 8. In this embodiment, the rod 403 is traversed throughout almost its entire length by a duct 404. This duct has an elbow at its lower end, which opens above the piston into the space 302b in the cylinder 302 inside which the piston 301 slides. The upper end of the duct 404 opens axially at the upper end of the rod 403. A member 405 is sealingly attached to the upper end of the rod 403. The upper part of the member 405 has the shape of a hollow cylinder and the piston 406 slides sealingly therein. The space 405a inside the member 405 beneath the piston 406 is in communication with the duct 404 through a duct 407 in the member 405. The rod 403 is resiliently connected to the suspended part of the vehicle. For this purpose the rod 403 passes through two blocks 408 and 409 of elastic material provided with caps 410 and 411 and between these blocks is a member 412 fixed to the suspended mass. This member 412 is provided with an anti-friction ring 413 which permits the rod 403 to slide freely through the member 412. The two blocks 408 and 409 of resilient material and their caps 410 and 411 are held at the top of the rod 403 by being gripped between the member 405 and a shoulder on the rod 403. A member 414 fixed to the suspended part of the vehicle limits the upward displacement of the piston 406. The space 405a and the ducts 407 and 404 are filled with hydraulic fluid, not shown on the drawings. The operation of a shock absorber according to this embodiment is identical to that of the embodiment shown in FIGS. 7, 8 and 9 or one of the simplified variations thereof when the movement is an expansive movement or a compressive movement at a substantially constant high speed. It differs when the compressive movement increases rapidly to reach a high value. In this case, at the beginning of the movement, the resilient block 408 is compressed and it transmits a weak damping force. When the block begins to be compressed, the volume in the space 405a decreases, the fluid is returned by the ducts 407 and 404 into the space 302b in the shock absorber, producing an increase in pressure on the control piston of the control valve. If the speed of movement is rapid, the valve opens before the damping force has attained a high value. The result obtained by this embodiment is similar to that obtained by the embodiment of FIGS. 10, 11 and 12. In a variation of this embodiment, the piston 406 is connected to the member 414 and thus to the suspended mass of the vehicle. The operation is the same as the one which has just been described. In another very similar embodiment, the rod of the shock absorber is resiliently connected to the suspended mass of the vehicle through metallic springs.

It will, of course, be appreciated that the embodiments which have just been described have been given purely by way of illustration and example and may be modified as to detail without thereby departing from the basic principles of the invention.

In particular, the embodiment of the control valve may be different in the two principal embodiments described. The ball may, for example, be replaced by a cone fixed to a control rod. The discharge passage of small section which forms part of the device generating the pressure on the control valve may be provided by leaving a small clearance between the piston of the valve and cylinder. In the foregoing description it has been assumed that the shock absorber is vertical and the rod directed upwardly. However, it is possible to position the shock absorber in any direction, provided that the shape and arrangement of the reservoir for receiving the fluid driven out by an increase in the immersed volume of the rod is modified in such a way that air cannot enter inside the shock absorber. This problem is not peculiar to shock absorbers according to the invention but is characteristic of all hydraulic shock absorbers.

On the other hand, the reservoir for the fluid which receives the fluid driven out by an increase in the immersed volume of the rod, which in the disclosed embodiments is annular in shape, and surrounds the shock absorber, may have any desired shape. In particular, it may be cylindrical in shape and positioned either outside the body of the shock absorber or at the end of the shock absorber which is not traversed by the rod. In this case, the shock absorber is generally mounted with the rod pointing downward. In the reservoir, the hydraulic fluid may be in direct contact with air, or separated therefrom by a fluid-tight membrane, or if the reservoir is of cylindrical shape, by a free piston sliding sealingly in the cylinder. The air may be replaced by any gas, the pressure of which may be greater than atmospheric pressure. The shock absorber according to the invention may be mounted on any vehicle which may be equipped with wheels, treads, feet or skis.

What is claimed is:
1. A telescopic shock absorber comprising
a cylinder containing a fluid,
a main piston fixed to a piston rod having a section smaller than that of said cylinder, said main piston being mounted to slide in said cylinder and divide said cylinder into first and second chambers through the second of which chambers said piston rod extends,
first connecting means between said chambers which permits said fluid to flow from said second chamber to said first chamber, but inhibits flow in the opposite direction, and
pressure-responsive means for controlling the flow of fluid from said first chamber to said second chamber, said pressure-responsive means comprising
a space,
second connecting means between said space and said second chamber,
valve means having a valve member separating said first chamber from said space, said valve means being subject to the pressure in said first chamber which urges it toward an open position,
additional means adapted to move in said space and having a first surface engaging said valve member and a second opposite surface, said first surface being exposed to the pressure of the fluid in said space and which pressure urges said additional means toward a position permitting said valve member to open, a fluid reservoir, said opposite surface being exposed to fluid pressure in said reservoir, flow restricter means in said additional means permitting a restricted flow of fluid directly between said space and said fluid reservoir, said flow restricter means producing an increased pressure in said space upon an increased flow rate into said space from said first chamber, and resilient means bearing against the opposite surface of said additional means and biasing it against said valve means in a direction which urges said valve means to its closed position, so that the pressure in said first chamber exerted against valve means plus the pressure exerted against the first surface of said additional means acts to counteract the pressure exerted by said resilient means against said additional means and thereby reduces the resistance to fluid flow past said valve means.

2. Shock absorber as claimed in claim 1 in which said additional means comprises an additional piston means slidably mounted in said space.

3. Shock absorber as claimed in claim 1 in which said flow restricter means permitting a restricted flow of fluid between said reservoir and said space comprises at least one passage having a small cross section and a pressure relief valve mounted in parallel therewith.

4. Shock absorber as claimed in claim 1 comprising a by-pass leading around said valve means and connecting said first chamber to said second chamber, and means preventing flow through said by-pass from said first chamber toward said second chamber.

5. Shock absorber as claimed in claim 1 comprising a by-pass leading around said valve means between said first chamber and reservoir, and means for preventing flow from said first chamber toward said reservoir.

6. Shock absorber as claimed in claim 1 in which said main piston is connected to said rod by means of an elastic member immersed in the fluid contained in said second chamber and capable upon compression of deforming elastically while retaining a constant volume whereby a sudden compression stroke provides a decrease of the volume of said second chamber corresponding to the volume of said rod moved into said second chamber thus increasing immediately the pressure in said second chamber and in said space through said second connecting means whereby said additional means permits an opening of said valve member before the main piston has substantially moved.

7. Shock absorber as claimed in claim 1 in which said cylinder and said pressure responsive means are slidably mounted inside a jacket defining a outer space and comprising a control valve having an additional valve member connecting a reservoir and said outer space when said additional valve member is operated by sliding movement of said cylinder and said pressure responsive means in response to a compressive force acting on the shock absorber.

8. Shock absorber as claimed in claim 1, in which said second chamber is connected to a third chamber defined in said rod and limited by an auxiliary piston attached to the suspended mass of a vehicle whereby a sudden compression stroke provides a decrease of the volume of said third chamber thus increasing immediately the pressure in said second chamber and in said space through said second connecting means whereby said additional means permits an opening of said valve member before the main piston has substantially moved.

9. A telescopic shock absorber comprising
a cylinder containing a fluid,
a main piston fixed to a piston rod having a section smaller than that of said cylinder, said main piston being mounted to slide in said cylinder and divide said cylinder into first and second chambers, through the second of which chambers said piston rod extends,
first connecting means between said chambers which permits said fluid to flow from said second chamber to said first chamber, but inhibits flow in the opposite direction, and
pressure-responsive means for controlling the flow of fluid from said first chamber to said second chamber, said pressure-responsive means comprising
a space,
second connecting means between said space and said second chamber,
a non-return valve in said second connecting means which prevents fluid flow therethrough from said second chamber into said space,
valve means having a valve member separating said first chamber from said space, said valve means being subject to the pressure in said first chamber which urges it toward an open position,
additional means adapted to move in said space having a first surface engaging said valve member and which is subject to the pressure of the fluid in said space and which urges said additional means toward a position permitting said valve members to open,
means permitting a restricted flow of fluid between said space and a fluid reservoir,
and resilient means bearing against the opposite surface of said additional means and biasing it against said valve means in a direction which urges said valve means to its closed position, so that the pressure in said first chamber exerted against valve means plus the pressure exerted against the first surface of said additional means acts to counteract the pressure exerted by said resilient means against said additional means and thereby reduces the resistance to fluid flow past said valve means.

10. A telescopic shock absorber comprising
a cylinder containing a fluid,
a main piston fixed to a piston rod having a section smaller than that of said cylinder, said main piston being mounted to slide in said cylinder and divide said cylinder into first and second chambers, through the second of which chambers said piston rod extends,
first connecting means between said chambers which permits said fluid to flow from said second chamber to said first chamber, but inhibits flow in the opposite direction, and
pressure-responsive means for controlling the flow of fluid from said first chamber to said second chamber, said pressure-responsive means comprising
a space,
second connecting means between said space and said second chamber,
valve means having a valve member separating said first chamber from said space, said valve means being subject to the pressure in said first chamber which urges it toward an open position, piston means slideably mounted in said space and having a first surface engaging said valve member, said first surface being subject to the pressure of the fluid in said space to urge said piston means toward a position permitting said valve member to open, means permitting a restricted flow of fluid between said space and a fluid reservoir, and resilient means bearing against the opposite surface of said piston means and biasing it against said valve means in a direction which urges said valve means to its closed position, so that the pressure in said first chamber exerted against said valve means plus the pressure exerted against the first surface of said piston means acts to counteract the pressure exerted by said resilient means against said piston means and thereby reduces the resistance to fluid flow past said valve means, said piston comprising a first part adjacent said velve member and a second part slidably connected thereto, said second part being provided with a constructed passage and non-return means preventing the flow of fluid therethrough toward said valve means, and said resilient means bearing against said first part.

* * * * *